(12) United States Patent
Lee

(10) Patent No.: US 7,574,454 B2
(45) Date of Patent: Aug. 11, 2009

(54) DYNAMIC LEARNING AND KNOWLEDGE REPRESENTATION FOR DATA MINING

(75) Inventor: Shih-Jong J. Lee, Bellevue, WA (US)

(73) Assignee: DRVision Technologies LLC, Bellevue, WA (US)

( * ) Notice: Subject to any disclaimer, the term of this patent is extended or adjusted under 35 U.S.C. 154(b) by 323 days.

(21) Appl. No.: 11/454,277

(22) Filed: Jun. 16, 2006

(65) Prior Publication Data

US 2006/0288031 A1 Dec. 21, 2006

Related U.S. Application Data

(62) Division of application No. 10/609,490, filed on Jun. 25, 2003, now Pat. No. 7,139,764.

(51) Int. Cl.
*G06F 17/30* (2006.01)
(52) U.S. Cl. .................................. 707/104.1; 707/101
(58) Field of Classification Search .................. 707/6, 707/101, 104.1
See application file for complete search history.

(56) References Cited

U.S. PATENT DOCUMENTS

| | | | |
|---|---|---|---|
| 7,266,510 B1 * | 9/2007 | Cofino et al. | 705/26 |
| 2006/0064415 A1 * | 3/2006 | Guyon et al. | 707/6 |

OTHER PUBLICATIONS

Keim, Daniel et al., "Information Visualization and Visual Data Mining", IEE Transactions on Visualization and Computer Graphics,vol. 8. No. 1, p. 1-8 [online] Jan. 2002. Retrieved from the Internet: <URL: http://ieeexplore.ieee.org/stamp/stamp.jsp?tp=& arnumber=981847& isnumber=21152>.*

Chi,Ed H. et. al., "A taxonomy of visualization techniques using the data statereference model", Proceedings of the IEEE Symposium on Information Visualization, P-69-75 [online] Oct. 2000. Retrieved from the Internet:<URL: http://ieeexplore.ieee.org /stamp/stamp. jsp?tp=&arnumber=885092&isnumber=19138>.*

* cited by examiner

*Primary Examiner*—Jean B. Fleurantin
*Assistant Examiner*—Dennis Myint

(57) ABSTRACT

An integrated human and computer interactive data mining method receives an input database. A learning, modeling, and analysis method uses the database to create an initial knowledge model. A query of the initial knowledge model is performed using a query request. The initial knowledge model is processed to create a knowledge presentation output for visualization. It further comprises a feedback and update request step that updates the initial knowledge model.

A multiple level integrated human and computer interactive data mining method facilitates overview interactive data mining and dynamic learning and knowledge representation by using the initial knowledge model and the database to create and update a presentable knowledge model. It facilitates zoom and filter interactive data mining and dynamic learning and knowledge representation by using the presentable knowledge model and the database to create and update the presentable knowledge model. It further facilitates details-on-demand interactive data mining and dynamic learning and knowledge representation by using the presentable knowledge model and the database to create and update the presentable knowledge model.

The integrated human and computer interactive data mining method allows rule viewing by a parallel coordinate visualization technique that maps a multiple dimensional space onto two display dimensions with data items presented as polygonal lines.

1 Claim, 8 Drawing Sheets

DYNAMIC LEARNING AND KNOWLEDGE REPRESENTATION FOR DATA MINING

CROSS REFERENCE TO RELATED APPLICATION

This is a divisional of U.S. application Ser. No. 10/609,490, filed Jun. 25, 2003 now U.S. Pat. No. 7,139,764.

TECHNICAL FIELD

This invention relates to a method for interactive data mining using dynamic learning and knowledge representation.

BACKGROUND OF THE INVENTION

During the last decade, there is an explosive growth in the capabilities to both generate and collect data. Advances in data collection, widespread use of bar codes for most commercial products, and the computerization of many business and government transactions have flooded us with information. In calendar year 2000, it is estimated that about 1 Exabyte (=1 million Terabyte) of data was generated and the trend is accelerating. The data collected could be a source of valuable information. However, finding valuable information and synthesizing useful knowledge hidden in them is a non-trivial task. Without adequate means to explore the large amount of data, the data becomes useless and the databases become data "dumps".

There is an urgent need for new techniques and tools that can intelligently and automatically assist a user in transforming data into useful knowledge. The emerging field of data mining and knowledge discovery in databases (KDD) creates significant research and product interests. Data mining can be defined as "The nontrivial extraction of implicit, previously unknown, and potentially useful information from data". Statistics, databases, machine learning, artificial intelligence and visualization techniques are applied in an attempt to discover and present knowledge in a form which is easily comprehensible to a human. Data mining related researches span classification and clustering, trend and deviation analysis, dependency modeling, integrated discovery systems, next generation database systems, visualization, and application case studies. Many tools and services are commercially available such as Decisionsite from Spotfire (Spotfire, http://www.spotfire.com/products/decision.asp), Insightful Miner from Insightful (Insightful, http://www.insightful.com/products/product.asp?PID=26), Clementine from SPSS (SPSS, http://www.spss.com/spssbi/clementine/index.htm), VisuaLinks from Visual Analytics (Visual Analytics, Inc. www.visualanalytics.com), Enterprise Miner from SAS (SAS Institute Inc. www.sas.com). However, there is only limited success in the adoption of the data mining technologies and tools for practical applications.

The prior art approach falls into two extremes. In one extreme, it relies heavily on a human's ability to search the database, understand detailed meaning of feature attributes and ability to comprehend statistics and learning methods. We call this approach the human dominated method. A visual data mining method (Keim Daniel, "Information Visualization and Visual data Mining", IEEE Trans. on Visualization and Computer Graphics, Vol. 7, No 1, Jan-March 2002) was developed that uses special visualization techniques to facilitate users direct involvement in the data mining process. Visual data mining techniques prioritize and display relations between data fields to harness the enormous human visual information processing capacity in order to rapidly traverse large information spaces and facilitate comprehension with reduced anxiety. However, it falls short of empowering users to harness vast data for efficient discovery of novel and important information. For noisy and inhomogeneous data sets it becomes ineffective because it cannot help the human separate strong data from weak data or exhibit the effects of strong or weak decisions. Unfortunately, some of the most important opportunities for data mining (i.e. geology, natural resource exploration, biomedical drug discovery, experimental physics) are characterized by weak and noisy data. This results in inconsistent data mining performance and it is difficult to create highly novel concepts and knowledge. This approach is also extremely inefficient when the database being explored is large.

The other extreme of the prior art approach heavily relies on a computer to automatically generate rules and discover knowledge from data (Ian H. Witten, Eibe Frank "Data Mining: Practical Machine Learning Tools and Techniques with Java Implementations", Morgan Kaufmann, October 1999.) We call this approach the computer dominated method. The automatic method relieves a human of the responsibility for deciding on the significance and relationships between the data. Unfortunately, the methods are very limited and rely on assumptions, which are often not valid in practical applications. When a mismatch exists between the assumptions and application situations, the automatically generated knowledge could be worse than useless since the knowledge indicated is not valid and may mislead the human. As application demand and data complexity are increasing, a general-purpose fully automatic data mining/knowledge discovery technology is not in sight. The path to success is the integration of human direction with computer inputs from automatic learning results. Existing software that allows users to effectively create data models and reach conclusions with measurable confidence are created only through arduous icon based programming tasks, and the data models are difficult to modify and understand. This interaction is reluctant, slow, costly and manual. Furthermore, most of the automatic learning methods do not support incremental update. So human feedback is not easily incorporated to refine the automatically generated knowledge. This invention bridges the gaps between the human dominated method and the computer dominated method. It lays the foundation for next generation integrated intelligent human/computer interactive data mining.

The effectiveness of human data mining could be greatly improved if the visualization of data could be effectively ranked and clustered according to the strength of the data and the strength of decision processes. Furthermore, counter examples could be shown through a contrasting approach that facilitates human discovery of subtle differences. The hierarchic structure of the regulation tree of this invention naturally maps to information granularity. This is an ideal representation that supports multi-level abstraction data mining process: overview, zoom and filter, details-on-demand.

OBJECTS AND ADVANTAGES

The primary object of the invention is to automatically generate and reveal computer discovered latent features and cues to a human. A second objective of the invention is to present the information to a human by ranking, clustering and searching for contrasting cases and transforming them into appropriate representation for effective visualization. A third object of the invention is to allow human feedback to incrementally update the discovered features and cues for human refined knowledge. A forth object of the invention is to validate human discovered latent features or cues for efficient confirmation or rejection of human hypotheses.

SUMMARY OF THE INVENTION

An integrated human and computer interactive data mining method receives an input database. A learning, modeling, and analysis method uses the database to create an initial knowledge model. A query of the initial knowledge model is performed using a query request. The initial knowledge model is processed to create a knowledge presentation output for visualization. The method of the invention further comprises a feedback and update request step that updates the initial knowledge model.

A multiple level integrated human and computer interactive data mining method performs overview interactive data mining and dynamic learning and knowledge representation using the initial knowledge model and the database to create and update a presentable knowledge model. It performs zoom and filter interactive data mining and dynamic learning and knowledge representation using the presentable knowledge model and the database to create and update the presentable knowledge model. It further performs details-on-demand interactive data mining and dynamic learning and knowledge representation using the presentable knowledge model and the database to create and update the presentable knowledge model.

The integrated human and computer interactive data mining method allows rule viewing by a parallel coordinate visualization technique that maps a multiple dimensional space onto two display dimensions and each data item is presented as a polygonal line.

BRIEF DESCRIPTION OF THE DRAWINGS

The preferred embodiment and other aspects of the invention will become apparent from the following detailed description of the invention when read in conjunction with the accompanying drawings, which are provided for the purpose of describing embodiments of the invention and not for limiting same, in which.

DETAILED DESCRIPTION OF THE INVENTION

I. Application Scenarios

Figure 1:
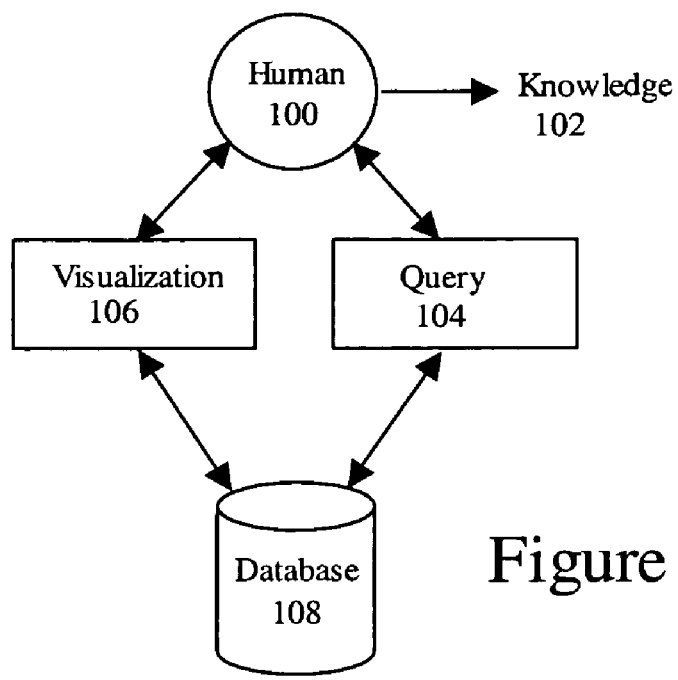
FIG. 1 shows the processing flow for the human dominated data mining method.
Figure 2:
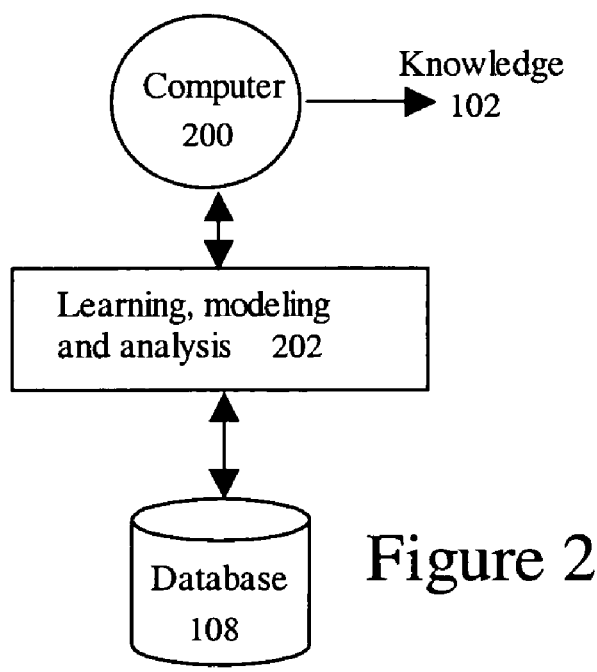
FIG. 2 shows the processing flow for the computer dominated data mining method.

Two data mining application scenarios are shown in FIG. 1 and FIG. 2. FIG. 1 shows the processing flow of a human dominated data mining process. As shown in FIG. 1, a human 100 queries a database 108 and the data are presented through a visualization component 106 that enhances the human's ability to comprehend the queried data. Through iterative application of query 104 and visualization 106, knowledge 102 is created by human 100 as the output of data mining.

FIG. 2 shows the processing flow of a computer dominated data mining process. As shown in FIG. 2, computer 200 accesses a database 108. It uses machine learning, modeling and analysis method 202 to automatically create knowledge 102 from the data.

The human dominated data mining process (FIG. 1) relies heavily on the human's ability to search the database, understand detailed meaning of feature attributes and ability to comprehend statistics and learning methods. This results in inconsistent data mining performance and is a difficult way to create highly novel concepts and knowledge. It is also extremely inefficient when the database being explored is large. It becomes ineffective for noisy and inhomogeneous data sets because it cannot help the human separate strong data from weak data or exhibit the effects of strong or weak decisions.

The computer dominated data mining process (FIG. 2) heavily relies on a computer to automatically generate rules and discover knowledge from data. The automatic method relieves the human of the responsibility for deciding on the significance and relationships between the data. Unfortunately, the methods are very limited and rely on assumptions, which are often not valid in practical applications.

Figure 3:
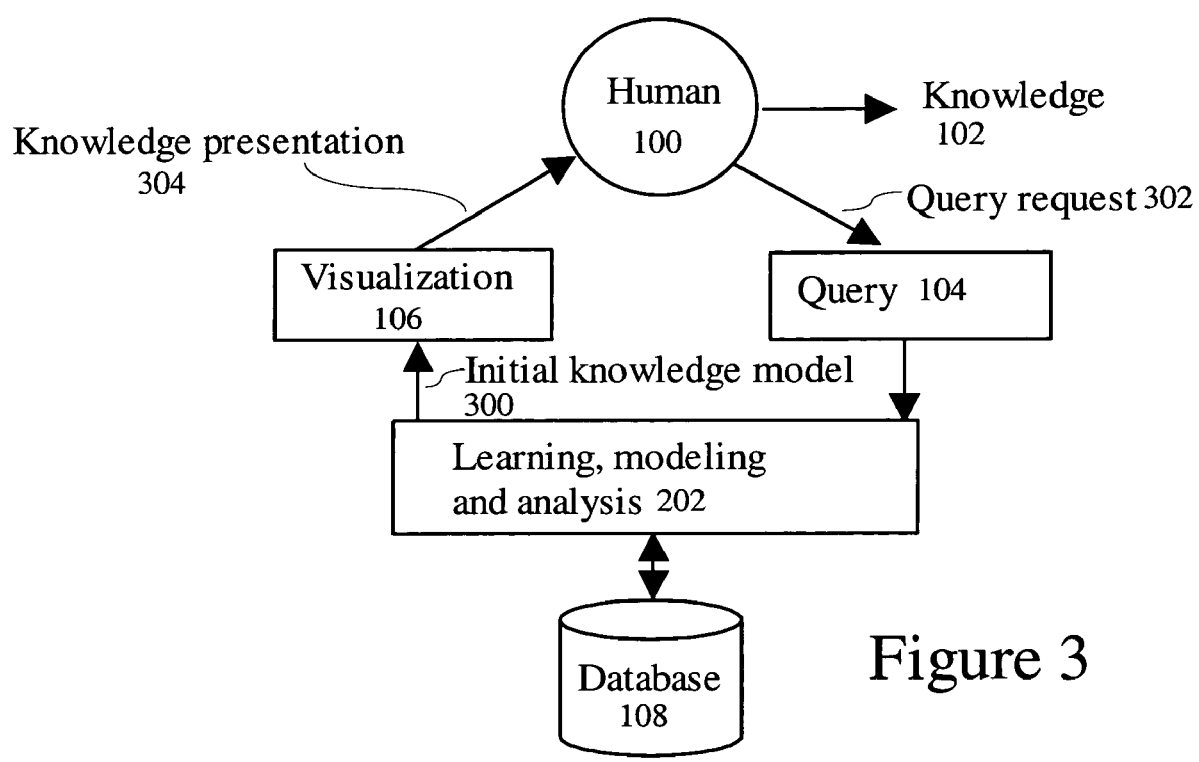
FIG. 3 shows the processing flow for the integrated human and computer interactive data mining method.

The high level processing flow for the integrated human and computer interactive data mining method of this invention is shown in FIG. 3. It integrates human 100 and computer 200 for data mining. As shown in FIG. 3, in a knowledge creation step, the computer uses machine learning, modeling and analysis method 202 to create an initial knowledge model 300 from the database 108. Instead of raw data, a human 100 queries the initial knowledge model 300 with the assistance of visualization 106 The human's role is to confirm or refute initial knowledge. Human 100 performs a query 104 of the initial knowledge model 300 using a query request 302. The system performs visualization processing from the initial knowledge model 300 to create a knowledge presentation 304 output for human visualization. The human could also initiate update of the initial knowledge model by feedback or explicit update request. A more detailed processing flow for the integrated human and computer interactive data mining method is shown in FIG. 4.

Figure 4:
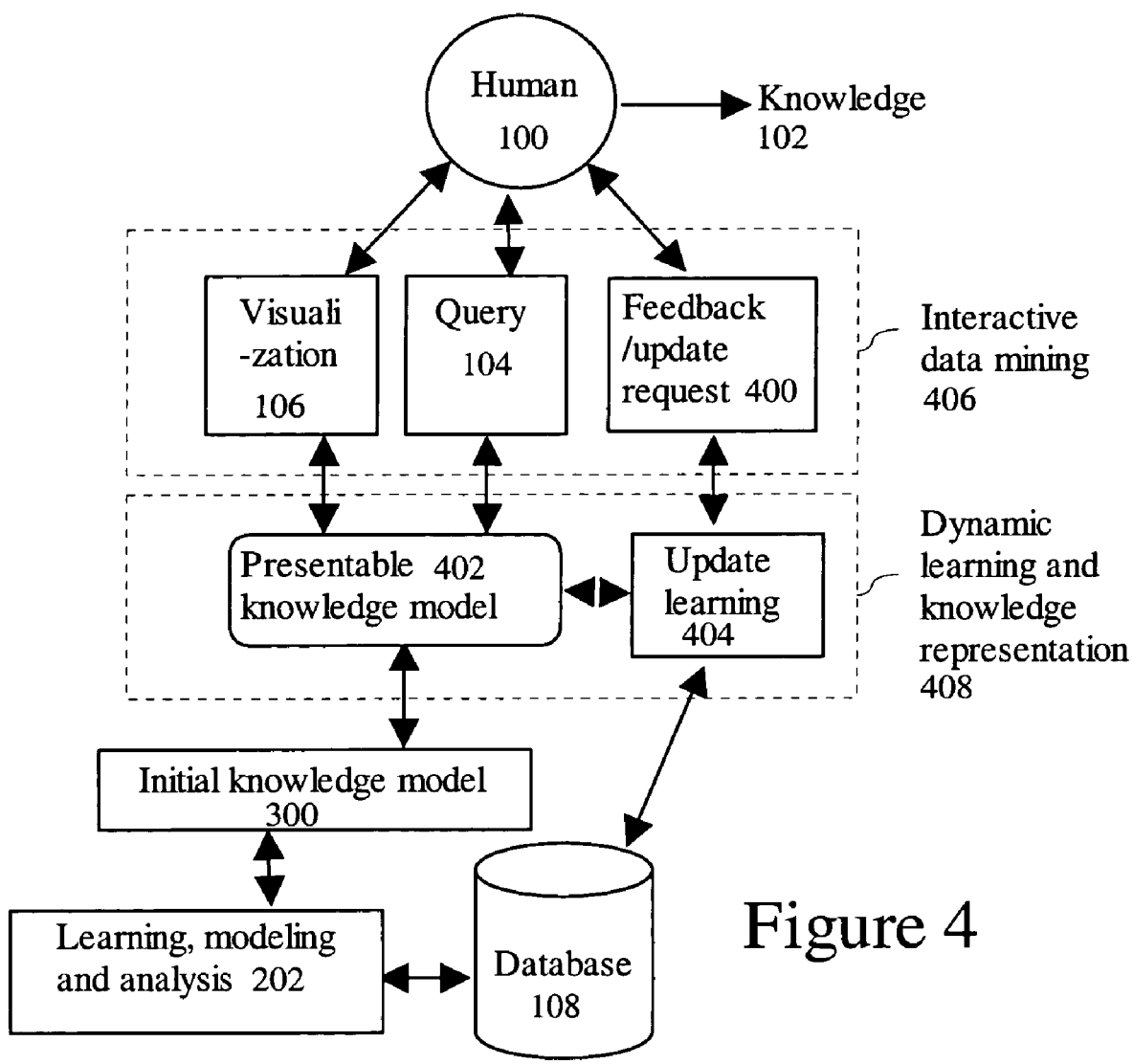
FIG. 4 shows the detailed processing flow for the integrated human and computer interactive data mining method.

As shown in FIG. 4, an initial knowledge model 300 is created automatically by a knowledge creation step using machine learning, modeling and analysis methods 202. The initial knowledge model 300 is converted into presentable knowledge model 402 that facilitates interaction with human by rule prioritization, clustering, and contrast example selection. The presentable knowledge model 402 can be queried 104 by human 100 and the information can be shown to human by special visualization techniques 106. After performing query 104 and visualization 106, human 100 could provide feedback and/or update request 400. This initiates a dynamic learning and knowledge representation process 408 that includes update learning 404 that updates the presentable knowledge model 402. The visualization 106, query 104 and feedback/update request 400 as a group is called interactive data mining 406. The interactive data mining can be performed at multiple levels of abstraction as shown in FIG. 5.

Figure 5:
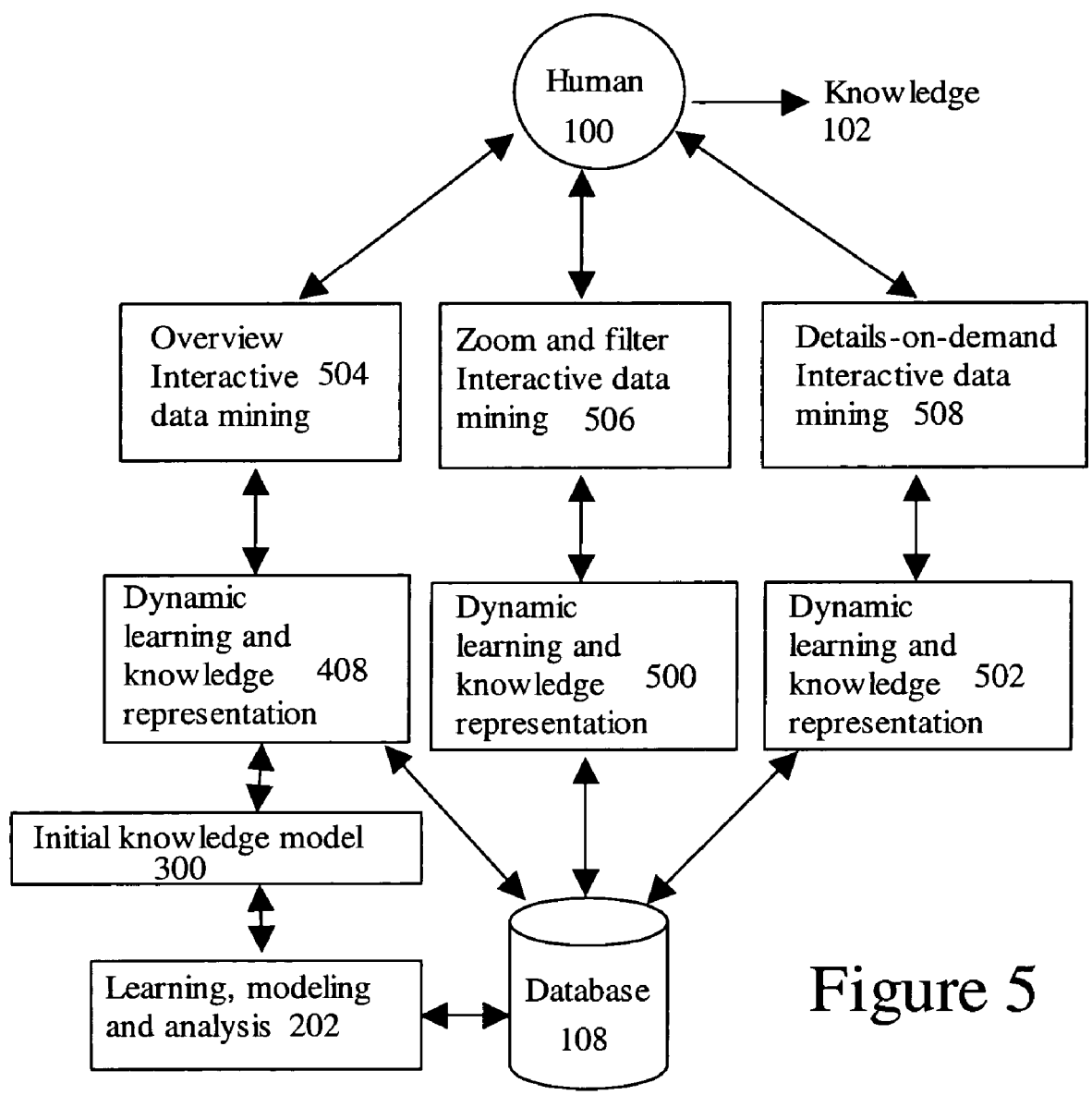
FIG. 5 shows the processing flow for the multiple level integrated human and computer interactive data mining method.

As shown in FIG. 5, the initial knowledge model 300 created by a knowledge creation step using machine learning, modeling, and analysis method 202 is used for overview interactive data mining 504 that provides high level overview information to human 100 and performs dynamic learning and knowledge representation 408 that updates the presentable knowledge model 402. The interactive data mining and dynamic learning and knowledge representation process 500 continues to specific areas of interest through zoom and filter interactive data mining 506. Finally, the interactive data mining and dynamic learning and knowledge representation process 502 allows details on demand interactive data mining 508 to refine and validate the knowledge created. The following sections provide detailed descriptions of each processing component of this invention.

II. Learning, Modeling, and Analysis

Figure 6:
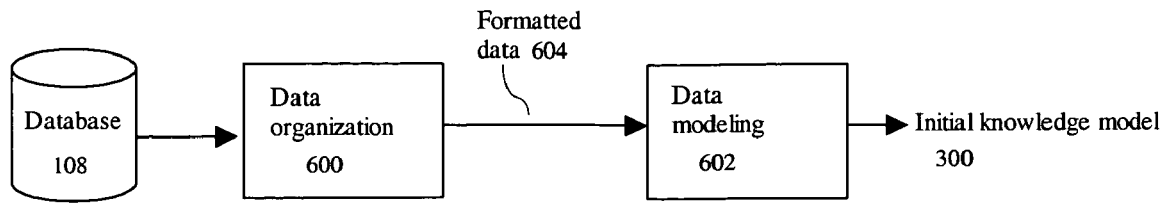
FIG. 6 shows the processing flow for the data learning, modeling and analysis method.

The learning modeling and analysis process 202 creates the initial knowledge model 300 from the database 108. It includes a data organization step 600 and a data modeling step 602 as shown in FIG. 6. The data organization step 600 accesses the database 108 to create formatted data 604 that is suitable for computer data modeling 602. The data modeling step uses the formatted data to create decision rules, regression models or clustering rules and models that are collectively called initial knowledge model 300.

II.1 Data Organization

The data organization step accesses the data and formats them into a unified presentation that is convenient for computer analysis. In one embodiment of the invention, the formatted data includes a number of samples. Each sample has a number of features and a label. The data organization step includes a data preparation step that creates the features and a label assignment step that creates the label. The data preparation step creates features from different fields of the database. It converts non-numerical data into numerals. It replaces missing and empty values. It also normalizes the data (Cooley, R., B. Mobasher, et al. (1999). "Data Preparation for Mining World Wide Web Browsing Patterns." *Knowledge and Information Systems* 1(1)). Furthermore, a weight could be assigned to each sample. Weights can be associated with samples on a variety of basis such as with the confidence of representation or accuracy of data acquisition, significance to a class determination, or other emphasis criteria. Equal weights can be applied if no additional information is available.

The label assignment step assigns a class or association label to each data sample. The class label groups samples into different classes. Each class represents certain events of interest. For example, in a drug discovery application, the class could correspond to diseased or normal cases. In manufacturing process control applications, class could correspond to defected or non-defected parts. Class information could readily be available from the source of the database or certain field of the database.

In applications, where classes of the data are unknown or not yet classified, a clustering method could be used to automatically determined the class grouping from the data. In this case, similarity between samples is measured and samples with high similarity are grouped into clusters and a unique class label is assigned to all members of a cluster. In one embodiment of the invention, the well-known clustering methods such as self-organization map (Ivan Perelomov, Arnulfo P. Azcarraga, Jonathan Tan, Tat Seng Chua "Using Structured Self-Organizing Maps in News Integration Websites", THE ELEVENTH INTERNATIONAL WORLD WIDE WEB CONFERENCE, 7-11 May 2002) or Fuzzy c-mean algorithms can be used (Liyan Zhang "Comparison of Fuzzy c-means Algorithm and New Fuzzy Clustering and Fuzzy Merging Algorithm", Computer Science Department University of Nevada, Reno).

In the case of mining for association rules, the variable of interest is identified and its value is assigned to each sample as its label. This facilitates the learning of regression mapping.

II.2 Data Modeling

Data modeling creates classification rules or regression mapping. In the preferred embodiment of the invention, regulation trees are improved and used for data modeling. A regulation tree is disclosed in U.S. patent application Ser. No. 09/972,057, filed Oct. 5, 2001 and entitled "Regulation of Hierarchic Decisions in Intelligent Systems" as well as in U.S. patent application Ser. No. 10/081,441, filed Feb. 22, 2002 and entitled, "Information Integration Method for Decision Regulation in Hierarchic Decision Systems", which are incorporated in their entirety herein. The resulting regulation tree is the initial knowledge model 300.

The enhanced regulation tree allows incremental update of the rules to facilitate dynamic learning. The regulation tree is an ideal representation from which to derive a presentable knowledge model.

II.2.1. Regulation Tree

A decision tree makes a decision through a hierarchical decision structure implemented as a tree. A tree consists of at least one non-terminal node and at least as many terminal nodes as the number of decision outcomes to be decided. Each outcome has associated at least one terminal node, and the non-terminal nodes represent various collections of mixed outcomes. The root node represents the entire collection of outcomes into which a new sample may be decided. The decision tree can be trained for classification or regression purposes.

Almost all decision trees are binary decision trees where each non-terminal node branches out two descending nodes. Without loss of generality, we use binary decision tree classifiers in the descriptions of this invention. Those skilled in the art should recognize that the method of this invention is applicable to other type of decision trees or other types of parametric or non-parametric decision methods.

Figure 7:
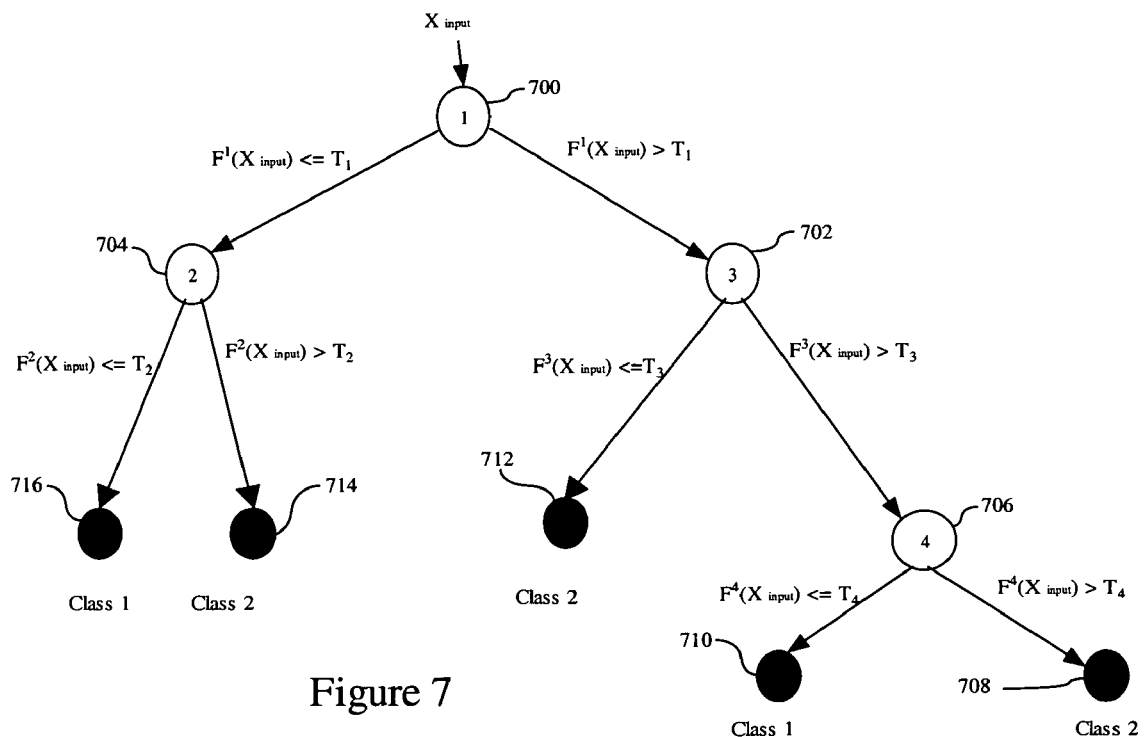
FIG. 7 shows a typical example of a binary decision tree.

FIG. 7 shows an example of a binary decision tree. A binary decision tree has two descendant paths (e.g. 702, 704 for node 700) for each non-terminal node. There is a decision rule associated with each non-terminal node to determine the descendant path for a sample at the node, until a terminal node is reached. The decision outcomes of a decision tree classifier 708, 710, 712, 714, 716 are classes associated with the input data. Examples of classes include disease types, defect classifications, weather patterns, etc.

In the classification mode, an unknown sample enters the decision tree at the root node 700 and the decision rule associated with the root node 700 is applied to the sample's feature vector to determine the descendant path that the sample will follow. This process is repeated until a terminal node (708, 710, 712, 714, or 716) is reached. Every terminal node has an associated class to which its samples are assigned.

The commonly used decision rule at a non-terminal node (700, 702, 704, or 706) is thresholding of a discrimination function value at the node. If the node's discrimination function value is less than or equal to a threshold value, the left child is taken; otherwise, the right child is taken for the descendant path. Feature thresholding is the simplest yet most easily understandable discrimination function. It selects a feature and uses its value to compare to a predetermined threshold. Other discrimination functions such as Fisher linear decision function, Bayes linear decision function, Bayes quadratic decision function and other single stage decision rules can also be used. Note that it is harder to interpret a decision tree when multiple features are involved in a discrimination function.

A typical decision tree makes crisp decisions. That is, it assigns a class unequivocally to an input sample. This method supports discontinuous decision boundaries well and is desirable in classification applications where context switching is required around decision boundaries. However, in applications that require generalization or in applications where the training samples cannot accurately predict decision boundaries or when the input samples are subject to noise and therefore perturb around the decision boundaries, a smooth decision around the decision boundary is desirable. A regulation tree can provide smooth decision boundaries.

A. Regulation Tree Generation

A regulation tree can be derived from an existing decision tree. The regulation tree shares the same tree structure as the decision tree, but it derives and stores additional statistics at each node. The regulation tree construction process inputs a decision tree and a set of training samples. The training samples can be the same training samples used to derive the decision tree, but they do not have to be. The regulation tree construction process includes the following steps:

1. For each non-terminal node n, determine the distance-to-threshold ($d_i$) values for each sample i associated with this node. The weighted mean ($\mu_d$) and standard deviation ($\sigma_d$) for the distance values are derived from the training sample distance values and stored in the node for the classification of new samples. The weighting factors are the weights associated with each sample. Equal weights can be applied if no additional information is available. A process such as tree focusing can also automatically determine weights. A simple iterative method accumulates the weighted distance value using the following rule:

Distance($k+1$)=Distance($k$)+$w_{k+1}$ * $d_{k+1}$

Weight($k+1$)=Weight($k$)+$w_{k+1}$

SquareDistance($k+1$)=SquareDistance($k$)+$w_{k+1}$ * $d^2_{k+1}$

After the accumulation of all samples associated with the node, the mean distance $\mu_d$ can be derived by $\mu_d$=Distance/Weight and the mean square distance $s^2_d$ can be derived by $s^2_d$=SquareDistance/Weight The distance standard deviation $\sigma_d$ value can be derived by $\sigma_d = \sqrt{s_d^2 - \mu_d^2}$ 2. For a terminal node n having $N^n$ weighted training samples. Let $N_c^n$ be the weighted class c training sample count at this terminal node n. The likelihood value for class c at terminal node n can be determined as:

$L_{class\_c}^n = N_c^n / N^n$.

An alterative method for likelihood value calculation is:

$L_{class\_c}^n = N_c^n / (N^n + \beta)$.

Where $\beta$ is a regulation parameter that weakens the likelihood values for terminal nodes having small number of training samples. The likelihood values are stored for each terminal node of the tree.

B. Regulation Tree Application

Given a new sample, $X_{input}$, the likelihood value at each non-terminal node n is determined first. To determine the likelihood value for a non-terminal node, the distance to threshold value is calculated as:

$d_{input} = f_n(X_{input}) - T_n$

Figure 8:
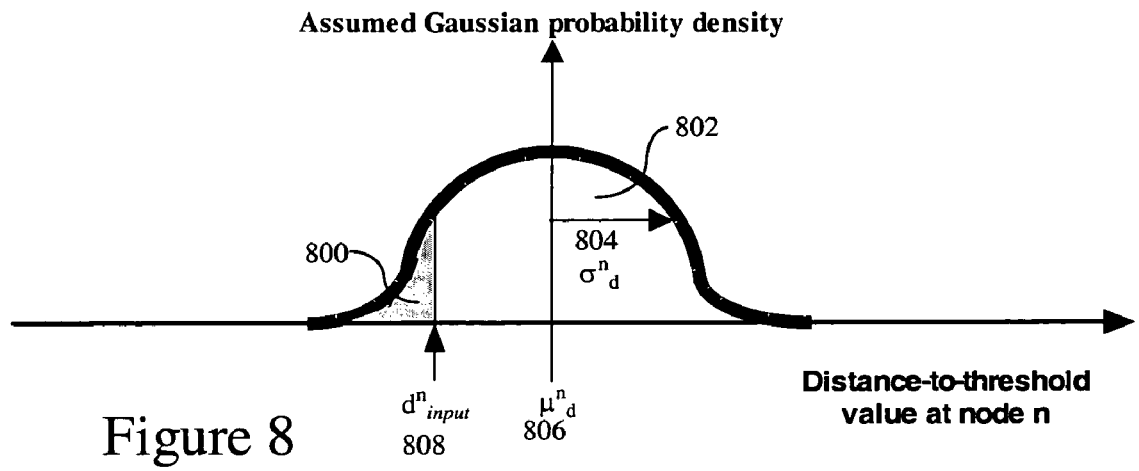
FIG. 8 illustrates the likelihood value determination process.

The likelihood value determination process is shown in FIG. 8.

If distance value, $d_{input}$, is zero or negative, the likelihood value for descending through the LEFT branch, L_LEFT, is one in a crisp tree. For purposes of illustration, assume a Gaussian distance probability density function offset according to the mean value for $d_{input}$ 808 and an absolute $d_{input}$ value that is zero or negative. Then, the probability that the sample could descend through the RIGHT branch $P_{right}$ 802 is calculated by $$P_{right} = \int_{-\infty}^{d_{input}} \frac{1}{\sqrt{2\pi}\,\sigma_d} e^{-\frac{(v-\mu_d)^2}{2\sigma_d^2}} dv$$

Where $\mu_d$ 806 is the mean of the distance probability density and $\sigma_d$ 804 is the standard deviation of the distance probability density.

The probability of being a sample that should descend through the LEFT branch is calculated as $P_{left} = 1 - P_{right}$ The likelihood value, L_LEFT, of the regulation tree for descending through the LEFT branch can be calculated as a linear combination of the crisp tree value (i.e. 1) and $P_{left}$ by a regulation parameter $\alpha$. That is, $L_{left} = 0.5 + \alpha + (0.5 - \alpha)P_{left}$ and $L_{right} = 1 - L_{left}$ If distance value, $d_{input}$, is positive, the likelihood value for descending through the LEFT branch, L_LEFT, and the likelihood value for descending through the RIGHT branch, L_RIGHT can be similarly determined.

Note that the a value regulates the crisp tree and probabilistic tree. When $\alpha=0.5$, the tree reverts to the original crisp tree. When $\alpha=0$, the tree averages the original crisp tree and a complete probabilistic tree with equal weight. When $\alpha=-0.5$, the tree is a complete probabilistic tree.

Since a sample, $X_{input}$, most likely has non-zero branch likelihood values for each of the terminal nodes, the confidence value that corresponds to class c for $X_{input}$, $Confidence_c$ (Xinput), can be determined by the following formula (see FIG. 9):

$$Confidence_c(X_{input}) = \sum_{j \in terminal\_nodes} \prod_{s \in branches\_to\_j} L\_s(X_{input}) L_{class\_c}^j$$

Figure 9:
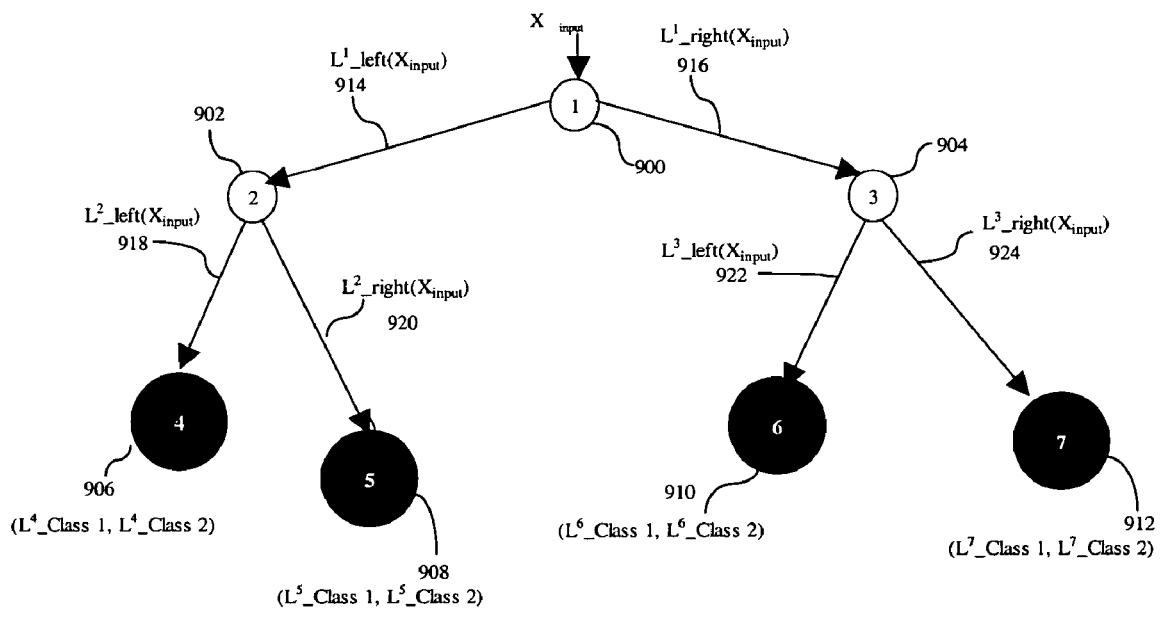
FIG. 9 shows the processing flow for the regulation tree class confidence value determination method.

FIG. 9 shows the example data for confidence determination diagrammatically for a tree having 3 non-terminal nodes 900, 902, 904 and 4 terminal nodes 906, 908, 910, 912 for classifying input samples into two classes, Class1 or Class2.

For any input sample $X_{input}$ the likelihood values that it will pass down any branch of the tree can be determined as illustrated. For example, in FIG. 9 the likelihood that it will pass down branch 914 has been determined to be $L^1\_left(X_{input})$. In the FIG. 9 example, these likelihood determinations are labeled for each branch of the tree for the particular input sample. Determine that the new sample $X_{input}$ is in a particular class as:

$$\text{Confidence\_class1}(X_{input}) = L^4\_class1 * L^2\_left(X_{input}) * L^1\_left(X_{input}) + $$
$$L^5\_class1 * L^2\_right(X_{input}) * L^1\_left(X_{input}) + $$
$$L^6\_class1 * L^3\_left(X_{input}) * L^1\_right(X_{input}) + $$
$$L^7\_class1 * L^3\_right(X_{input}) * L^1\_right(X_{input})$$

$$\text{Confidence\_class2}(X_{input}) = L^4\_class2 * L^2\_left(X_{input}) * L^1\_left(X_{input}) + $$
$$L^5\_class2 * L^2\_right(X_{input}) * L^1\_left(X_{input}) + $$
$$L^6\_class2 * L^3\_left(X_{input}) * L^1\_right(X_{input}) + $$
$$L^7\_class2 * L^3\_right(X_{input}) * L^1\_right(X_{input})$$

Where the likelihood value for each class is known for each of the terminal nodes and depicted for node 4 (906) as $L^4\_Class1$ and $L^4\_Class2$, node 5 (908) as $L^5\_Class1$ and $L^5\_Class2$, node 6 (910) as $L^6\_Class1$ and $L^6\_Class2$ and node 7 (912) as $L^7\_Class1$ and $L^7\_Class2$. The associated likelihood values determined for a particular input sample $X_{input}$ that are referred to in the equations above are $L^1\_left(X_{input})$ (914), $L^1\_right(X_{input})$ (916), $L^2\_left(X_{input})$ (918), $L^2\_right(X_{input})$ (920), $L^3\_left(X_{input})$ (922), $L^3\_right(X_{input})$ (924).

The classification process can be performed based upon the confidence determined for each input ($X_{input}$) The classification result, $C^*$, can be determined by the rule:

$$C^*(X_{input}) = \arg\max_c \text{Confidence}_c(X_{input})$$

In the case of regression tree, the regression value for the input sample can be similarly determined using the following formula $$Y(X_{input}) = \sum_{j \in \text{terminal\_nodes}} \prod_{s \in \text{branches\_to\_j}} L\_s(X_{input}) Y^j$$

Where $Y^j$ is the regression output for terminal node j.

In this embodiment of the invention, the resulting regulation tree, along with the formatted data, constitutes the initial knowledge model 300.

III. Presentable Knowledge Model Generation

Figure 10:
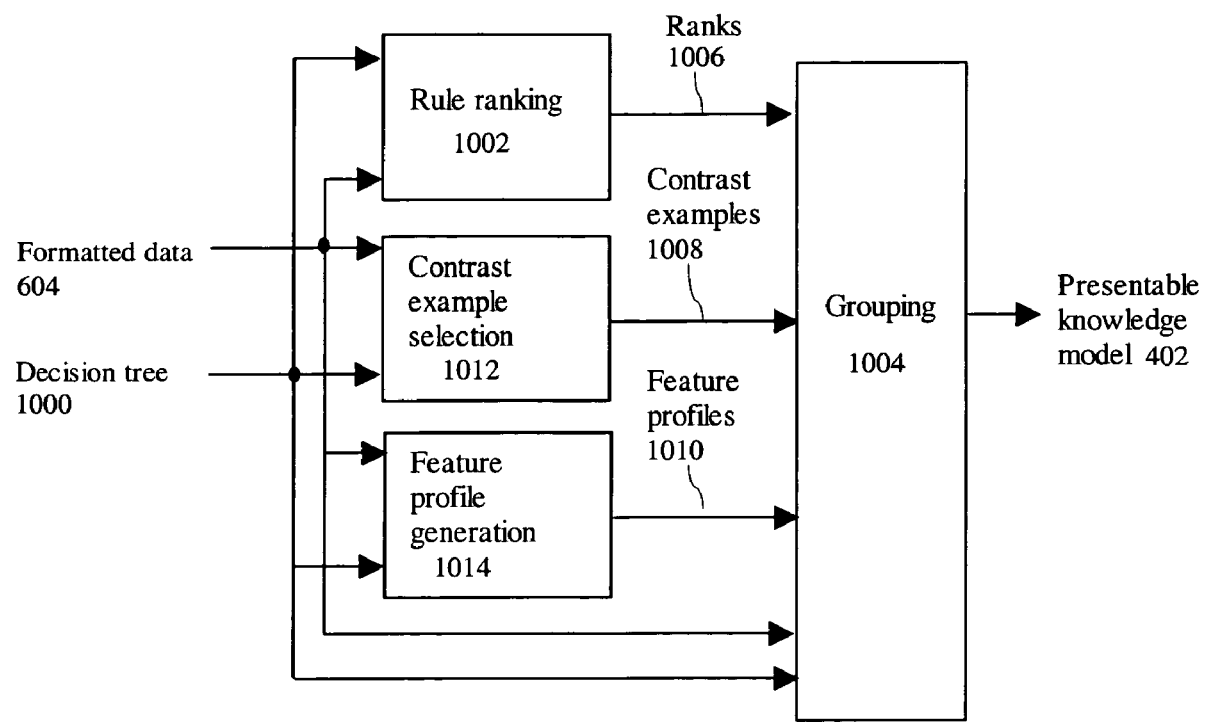
FIG. 10 shows the processing flow for the presentable knowledge model generation method.

The regulation tree resulting from the initial knowledge model is difficult to present to a human. To facilitate productive data mining by intelligent human computer interface, the initial knowledge model is processed to create a presentable knowledge model. In addition to the regulation tree or other decision trees or knowledge representation, the presentable knowledge model also includes the following information 1. Ranks for the rules associated with each of the tree terminal nodes
2. Contrast examples for each terminal node
3. Associated feature distribution profiles for each non-terminal node The additional information facilitates visualization and query by the human. The presentable knowledge model generation process is shown in FIG. 10. It includes a rule ranking step 1002, a contrast example selection step 1012 and a feature profile generation step 1014 or selected portions thereof. They can be performed in parallel using the decision tree 1000 (or regulation tree) and the formatted data 604 stored in the initial knowledge model 300. The resulting ranks 1006, contrast examples 1008 and feature profiles 1010 are grouped 1004 into the presentable knowledge model 402.

III.1 Rule Ranking

The terminal nodes of a regulation tree represent decision rules. The regulation tree may have many terminal nodes for a large database. It is usually impractical to show the human all possible rules. Therefore, the goodness of the rules is ranked for selected presentation. For a terminal node n in a decision tree, the prior art approach uses only $N_c^n$ the weighted class c training sample count at this node n to derive rules for classification or a node effectiveness estimate. The decision regulation approach of this invention uses additional information that characterizes the global and population statistics of the data for classification and node effectiveness estimation. In a preferred embodiment of the invention, up to four types of information are used for each node: local counts, local population statistics, global counts and global population statistics.

III.1.1 Global Characteristics and Population Characteristics

III.1.1.1 Local Counts

These include the same information as that of the prior art approach. They consist of $N_c^n$, the weighted class c training sample count at a node n.

III.1.1.2 Local Population Statistics

These include $P_c^n$, the weighted class c training sample proportion at a node n. Where $$P_c^n = \frac{N_c^n}{\sum_{i \in \text{Class\_c\_in\_all\_training\_samples}} w_i^c}$$

In the case that all classes have the same weighted training sample counts, the local counts and local population statistics contain essentially the same information. However, when the weighted training sample counts are different for different classes, the $P_c^n$ will have higher relative value for classes with smaller training sample counts. Therefore, local population statistics provide a prevalence independent characterization of the node n. This information could be used to avoid the systematic misclassification of samples from low prevalence classes. This is especially important for correct rare event classification or correctly classifying the classes whose training samples are limited.

III.1.1.3 Global Counts

For each node n except the root node, there exists a parent node p. Let $f^p(x) \geq 0$ be the decision rule of node p that leads to node n when satisfied. Let $G^n$ be the global training sample set associated with node n. The global counts consist of $G_c^n$ the weighted class c training sample count for the samples in $G^n$ that satisfy the decision rule $f^p(x) \geq 0$. In one embodiment of the invention, $G^n$ is defined as the training samples that are up to k layers above node n. When k=1, $G^n$ includes the training samples in the parent node p, i.e. $G^n = U^p$. In this case, the global counts are identical to the local counts, that is $G_c^n = N_c^n$. When k >1, additional samples above the parent node p are included. A larger k includes more global contexts of the node n. When k is sufficiently large, $G^n$ can include all training samples as its global context. Therefore the global context coverage can be adjusted using different layer depths.

Those skilled in the art should recognize that other methods of defining $G^n$ can be used in the invention. For example, a minimum number of training samples or a proportion of total samples rather than the layer k can be used to define the global training sample set $G^n$.

III.1.1.4 Global Population Statistics

These include $g_c^n$, the weighted global class c training sample proportion at a node n.

Where $$g_c^n = \frac{G_c^n}{\sum_{i \in \text{Class\_c\_in\_all\_training\_samples}} w_i^c}$$

In the case that all classes have the same weighted training sample counts, the global counts and global population statistics contain basically the same information. However, when the weighted training sample counts are different for different classes, the $g_c^n$ will have higher relative value for classes with smaller training sample counts. Therefore, global population statistics provide a prevalence independent global characterization of the node n. This information is used to avoid the systematic misclassification of samples from low prevalence classes.

III.1.2 Rule Ranking by Information Integration

The global and population characteristics of this invention provide a framework for rule ranking that discriminates between noise and consistent application characteristics. It also allows a correction for prevalence discrepancy in the training data. Without loss of generality, rule ranking for a classification tree is discussed. Rule ranking for regression trees can be achieved using similar methods.

In one embodiment of the invention, to rank rules in a classification tree, a class confidence value is derived from each type of the characteristics for each terminal node. The confidence value for a class c is defined as the ratio between the characteristic value of the class c and that of all classes.

The local count confidence for class c in a terminal node n is defined as:

$$LC_c^n = \frac{N_c^n}{\sum_{c \in \text{All\_Classes\_in\_n}} N_c^n}.$$

Similarly, the local population confidence for class c in a terminal node n is defined as:

$$LP_c^n = \frac{P_c^n}{\sum_{c \in \text{All\_Classes\_in\_n}} P_c^n}.$$

The global count confidence for class c in a terminal node n is defined as:

$$GC_c^n = \frac{G_c^n}{\sum_{c \in \text{All\_Classes\_in\_n}} G_c^n};$$

and the global population confidence for class c in a terminal node n is defined as:

$$GP_c^n = \frac{g_c^n}{\sum_{c \in \text{All\_Classes\_in\_n}} g_c^n}.$$

In one embodiment of the invention, an integrated confidence value $IC_c^n$ for a class c in a terminal node is defined as a weighted combination of the class c confidence values by the following rule:

$$IC_c^n = a * LC_c^n + b * LP_c^n + c * GC_c^n + d * GP_c^n$$

Where a, b, c and d are weights for integration. The weights a, b, c and d allow for great flexibility in decision strategy that can be selected to suit an application. When b, c and d are set to 0, the integrated results degenerate to the prior art approach that relies solely on local counts. When a and c are set to 0, a new training class prevalence independent decision strategy is created. When c and d are set to 0, a training class prevalence corrected local based decision strategy is created. Similarly, when a and b are both set to 0, a training class prevalence corrected global based decision strategy is created. Furthermore, the global context coverage can be adjusted using different layer depth k as defined in III.1.1.3. These parameter adjustments are ideal to tailor the ranking for different levels of interactive data mining. Large k values are used for overview, moderate k values are used for zoom, and low k values are used for details. Depending on the filtering, different k values may be used. Similarly, the adjustment of a, b, c, and d allow different levels of focus between overview to details.

The integrated confidence value could be used to rank different decision rules. In addition, integrated confidence values could be used for ranking to achieve a good balance between local and global characteristics. Comparing the local, global, count and population confidences $LC_c^n$, $LP_c^n$, $GC_c^n$, $GP_c^n$ could identify unreliable nodes. In a preferred embodiment of the invention, four confidence ratios are defined:

$$\frac{LP_c^n}{(LC_c^n + LP_c^n)}, \frac{GC_c^n}{(LC_c^n + GC_c^n)}, \frac{GP_c^n}{(LP_c^n + GP_c^n)}, \frac{GP_c^n}{(GC_c^n + GP_c^n)}.$$

$$\frac{LP_c^n}{(LC_c^n + LP_c^n)}$$

measures the local population effect. If the value is significantly different from 0.5, there is a mismatch between local count and local population based decision. So the results may not be reliable. In the preferred embodiment of the invention, a local population reliability measure $R_{LP}$ is defined as $$R_{LP} = 1 - 2 * \left| \frac{LP_c^n}{(LC_c^n + LP_c^n)} - 0.5 \right|.$$

$$\frac{GC_c^n}{(LC_c^n + GC_n^c)}$$

measures the global and local count difference effect. If the value is significantly different from 0.5, there is a mismatch between the global and local count based decision. So the results may not be reliable. In one embodiment of the invention, a count reliability measure $R_c$ is defined as $$R_c 1 - 2 * \left| \frac{GC_c^n}{(LC_c^n + GC_c^n)} - 0.5 \right|.$$

$$\frac{GP_c^n}{(LP_c^n + GP_c^n)}$$

measures the global and local population effect. If the value is significantly different from 0.5, there is a mismatch between global and local population based decisions. So the results may not be reliable. In one embodiment of the invention, a population reliability measure $R_p$ is defined as $$R_P = 1 - 2 * \left| \frac{GP_c^n}{(LP_c^n + GP_c^n)} - 0.5 \right|.$$

$$\frac{GP_c^n}{(GC_c^n + GP_c^n)}$$

measures the global population effect. If the value is significantly different from 0.5, there is a mismatch between global count and global population based decisions. So the results may not be reliable. In one embodiment of the invention, a global population reliability measure $R_{GP}$ is defined as $$R_{GP} = 1 - 2 * \left| \frac{GP_c^n}{(GC_c^n + GP_c^n)} - 0.5 \right|.$$

In one embodiment of the invention, a combined reliability measure R can be defined as:

$$R = w_{LP}R_{LP} + w_c R_c + w_P R_P + w_{GP} R_{GP}$$

Where $w_{LP}$, $w_c$, $w_P$, $w_{GP}$ are combination weighting factors.

Those skilled in the art should recognize that other reliability measures and other methods of reliability combination such as nonlinear functions could be used. Some examples are as follows:

$$1 - 2 * \left| \frac{GP_c^n}{(LC_c^n + GP_c^n)} - 0.5 \right|, 1 - 2 * \left| \frac{GC_c^n}{(LP_c^n + GC_c^n)} - 0.5 \right|.$$

Furthermore, other methods of reliability combination such as nonlinear functions can be used in the invention.

A new rule ranking method can be defined as a combination of the integrated confidence value and the reliability value. In one embodiment of the invention, the combination is done by the following rule $$RR = w_R R + w_C IC.$$

Where $w_R$ and $w_c$ are weighting factors. Those skilled in the art should recognize that other methods of combination such as nonlinear functions can also be used. For example:

$$RR = \text{Max}(R, IC) \text{ or}$$

$$RR = \text{Min}(R, IC)$$

III.2 Contrast Example Selection

When showing human a selected rule. It is important to provide information from all perspectives for a fair assessment. In this invention, a contrast method is used for this purpose. The contrast method selects samples of similar characteristics that match the selected rule yet have distinctively different labels.

To select contrast examples for a selected rule, all samples in its corresponding terminal node are examined. If all samples have correct label, no contrast example exist for the rule. When incorrect labels exist. The label type having the largest population of mislabels is identified and called "wrong label". The representative feature values of the correct label and wrong label population are determined. The features used are the features associated with the rule. They are the features used by all nodes leading to the terminal node of interest.

In one embodiment of the invention, the weighted median feature values for the correct label and wrong label samples are used as the representative features. The weights of the samples are used for the calculation. In another embodiment of the invention, the weighted trim mean of the feature values for the correct label and wrong label samples are used as the representative features. In yet another embodiment of the invention, weighted clustering analysis is performed separately for the correct label and the wrong label populations. The cluster centers are used as the representative features for the correct label and wrong label. In this case, it is likely that multiple representative feature sets could exist, each correspond to a cluster center.

The samples from the correct label and wrong label are sorted according to their closeness (or similarity) to the representative feature values. The contrast examples are the high rank samples from both the correct label and the wrong label population.

III.3 Feature Profile Generation

In automatic learning, modeling, and analysis, not only the fields in the database are used, new features could be automatic generated by computer feature learning. The computer automatically generated features may have good discrimination power yet they may not have easily understandable definition.

To improve human comprehension of the features used in a knowledge rule of interest. The profiles of the features are generated. To generate feature profile, a feature is first normalized. In one embodiment of the invention, the normalization of a feature f can be performed by:

$$f_n = \frac{f - f_\mu}{f_\sigma}$$

Where $f_\mu$ and $f_\sigma$ are the weighted mean and weighted standard deviation of feature f.

In another embodiment of the invention, the normalization of a feature f is performed by:

$$f_n = \frac{f - f_{m0}}{f_R}$$

Where $f_{m0}$ and $f_R$ are the weighted median and weighted range of feature f. The range is defined as the difference between 25% and 75% of the weighted ranked feature values. The normalized features are weighted ranked and the ranks of the samples for each feature are prepared for quick feature visualization. The weighted ranking process ranks a sample and uses its weight to generate a feature histogram.

IV. Update Learning

The update learning process updates the regulation tree upon the request from user or feedback examples provided by the users. There are different conditions for updates: (1) remove a sample (2) remove a rule (3) add a sample (4) add a rule. As will become evident from the follow-on descriptions that the update involves limited processing and therefore can be performed rapidly to support interactive data mining.

IV.1 Remove a Sample

To remove a sample with weight w, the sample is subject to the regulation tree for crispy decision. The terminal node and the non-terminal node associated with the crispy decision of the sample are updated to reflect the changes.

Let the sample associated terminal node be n and the sample label be c, the weighted training sample count $N^n$ and the weighted label c training sample count $N_c^n$ at this terminal node n are updated by:

$N^n = N^n - w$ $N_c^n = N_c^n - w$

The likelihood value for each class label in node n are updated using the new $N^n$ and $N_c^n$ accordingly.

For each of the associated non-terminal nodes, the distance-to-threshold value d is determined for the sample. The Distance, Weight, and SquareDistance values are updated by the following rules:

Distance=Distance$-w*d$

Weight=Weight$-w$

SquareDistance=SquareDistance$-w*d^2$

The mean distance $\mu_d$ and the mean square distance $s^2_d$ as well as the distance standard deviation $\sigma_d$ value for the node n are updated using the new Distance, Weight, and SquareDistance values accordingly.

IV.2 Remove a Rule

To remove a rule, in one embodiment of the invention, all samples in the terminal node associated with the rule are removed following the above sample removal rules. This changes the statistics of not only terminal node but also non-terminal nodes. This may not be desirable since the non-terminal nodes in the higher level of the hierarchy are shared by many terminal nodes. An alternative embodiment of the invention only updates the terminal node yet does not update the non-terminal node.

IV.3 Add a Sample

To add a sample with weight w, the sample is subject to the regulation tree for crispy decision. The terminal node and the non-terminal node associated with the crispy decision of the sample are updated to reflect the changes.

Let the sample associated terminal node be n and the sample label be c, the weighted training sample count $N^n$ and the weighted label c training sample count $N_c^n$ at this terminal node n are updated by:

$N^n = N^n + w$ $N_c^n = N_c^n + w$

The likelihood value for each class label in node n are updated using the new $N^n$ and $N_c^n$ accordingly.

For each of the associated non-terminal node, the distance-to-threshold value d is determined for the sample. The Distance, Weight, and SquareDistance values are updated by the following rules:

Distance=Distance$+w*d$

Weight=Weight$+w$

SquareDistance=SquareDistance$+w*d^2$

The mean distance $\mu_d$ and the mean square distance $s^2_d$ as well as the distance standard deviation $\sigma_d$ value for the node n are updated using the new Distance, Weight, and SquareDistance values accordingly.

IV.4 Add a Rule

The new rules may or may not involve new features that are not used in the existing regulation tree. In the case that no new features are involved, in one embodiment of the invention, an artificial sample with the feature values exactly matches the rule is created. The artificial sample is given very high weight and is subject to the regulation tree for crispy decision. The terminal node and the non-terminal node associated with the crispy decision of the sample are updated to reflect the changes. It may not be desirable to change the statistics of the non-terminal nodes since many terminal nodes share the non-terminal nodes in the higher level of the hierarchy. An alternative embodiment of the invention only updates the terminal node yet does not update the non-terminal node.

In the case that new features are involved, the same procedure is applied using existing features. The terminal node is then further expanded using the new features to create additional node for the new rule and the other nodes to retain the old rule associated with the terminal node.

V. Interactive Data Mining

Interactive data mining involves visualization, query, and feedback/update request. The human mainly initiates the query and feedback/update request and the visualizations are supported and facilitated by the computer using the presentable knowledge model. The primary visualization functions include rule viewing following the sorted ranks, feature viewing, and contrast presentation. The processing steps include overview, zoom and filter, and details-on-demand as shown in FIG. 5.

V.1 Rule Viewing

Figure 11:
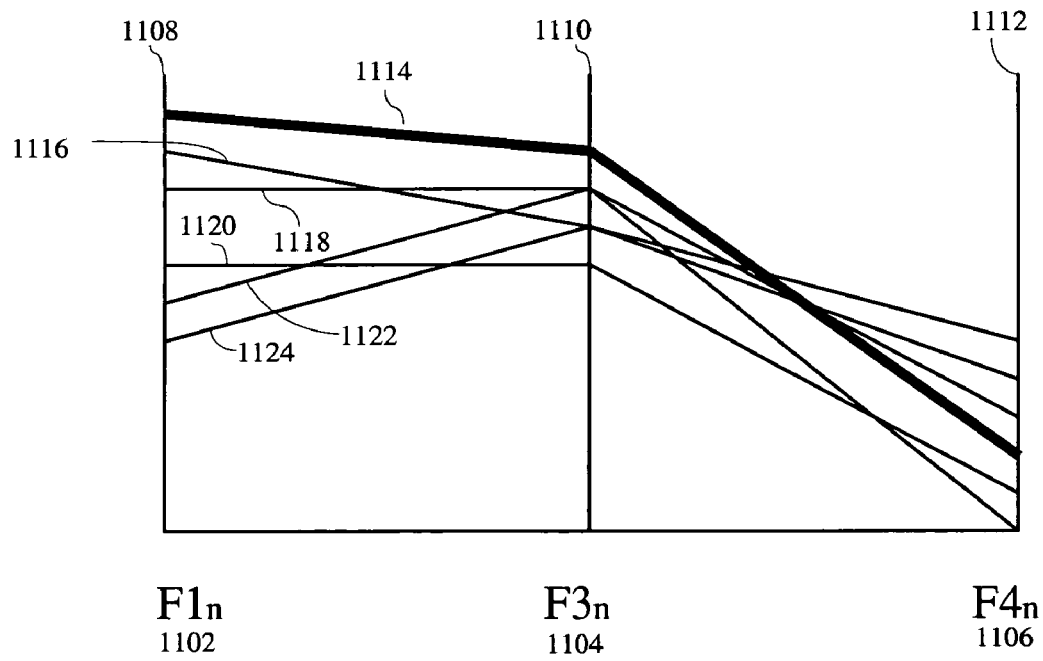
FIG. 11 shows an illustrative example of the parallel coordinate viewing of the rule corresponding to node 708 of the binary decision tree as shown in FIG. 7.

Since the knowledge rule in a regulation tree is represented by a path from the root node through non-terminal nodes toward a terminal node and each non-terminal node involves one feature, it can be conveniently shown to a human by the parallel coordinate visualization technique (Keim Daniel, "Information Visualization and Visual data Mining", IEEE Trans. on Visualization and Computer Graphics, Vol. 7, No 1, January-March 2002). FIG. 11 shows an illustrative example of the parallel coordinate viewing of the rule corresponding to node 708 of FIG. 7 assuming six samples are included. The parallel coordinate technique maps an M dimensional space onto two display dimensions by using M equidistance axes, which are parallel to one of the display axes. The axes corresponding to the dimensions are scaled to cover the range from the minimum value to the maximum value of the corresponding dimension. Each data item is presented as a polygonal line (1114, 1116, 1118, 1120, 1122, or 1124), intersecting each of the feature axes (1108, 1110, or 1112) at the point corresponding to the value of the considered dimension/feature (1102, 1104, or 1106). Although the principle idea of the parallel coordinate visualization method is quite simple, it is powerful in revealing a wide range of data characteristics such as different data distributions and functional dependencies. Note that the weights of the samples could be highlighted by the thickness of the lines. As shown in FIG. 11, the first data point 1114 (having the highest $F1_n$ value) has higher weight than the other data points. Those skilled in the art should recognize that other methods of weight mapping such as using colors could be used. Furthermore, other multi-dimensional visualization technique could also be used and they are all within the scope of the invention.

V.2 Feature Viewing

Figure 12:
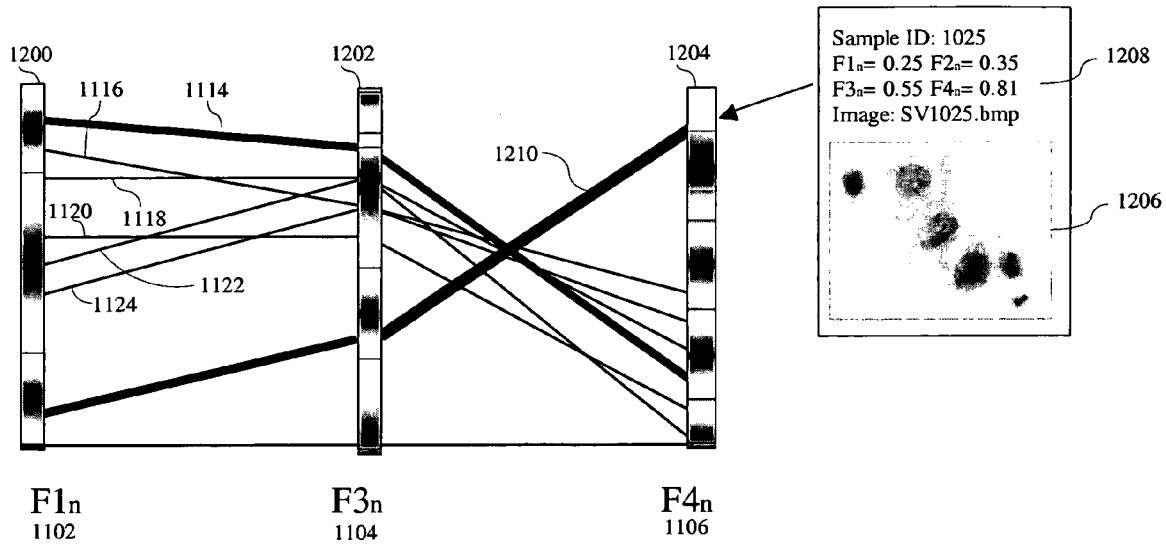
FIG. 12 shows an illustrative example of the feature viewing under the parallel coordinate method.

The normalized feature profiles could be effectively encoded into parallel coordinate displays. This is illustrated in FIG. 12. In one embodiment of the invention, the histograms of the normalized features are directly shown as bars that are encoded by different shading to replace the feature axes (1200, 1202, or 1204). In this example, the darker shade represents higher sample density of the feature histogram. Furthermore, in one embodiment of the invention, the histogram bars are linked to their corresponding samples. Therefore, a human could click on the histogram bar to access the samples. Zooming capability could be provided that allows the isolation of an individual sample. The sample's information such as feature values, image, etc. can be conveniently displayed. The feature values of interest 1208 could be shown in the parallel coordinate viewing or could be printed out and the image 1206 could be displayed.

Those skilled in the art should recognize that other methods of feature histogram mapping such as using colors could be used. Furthermore, other methods of showing individual samples could also be used and they are all within the scope of the invention.

V.3 Contrast Presentation

Figure 13:
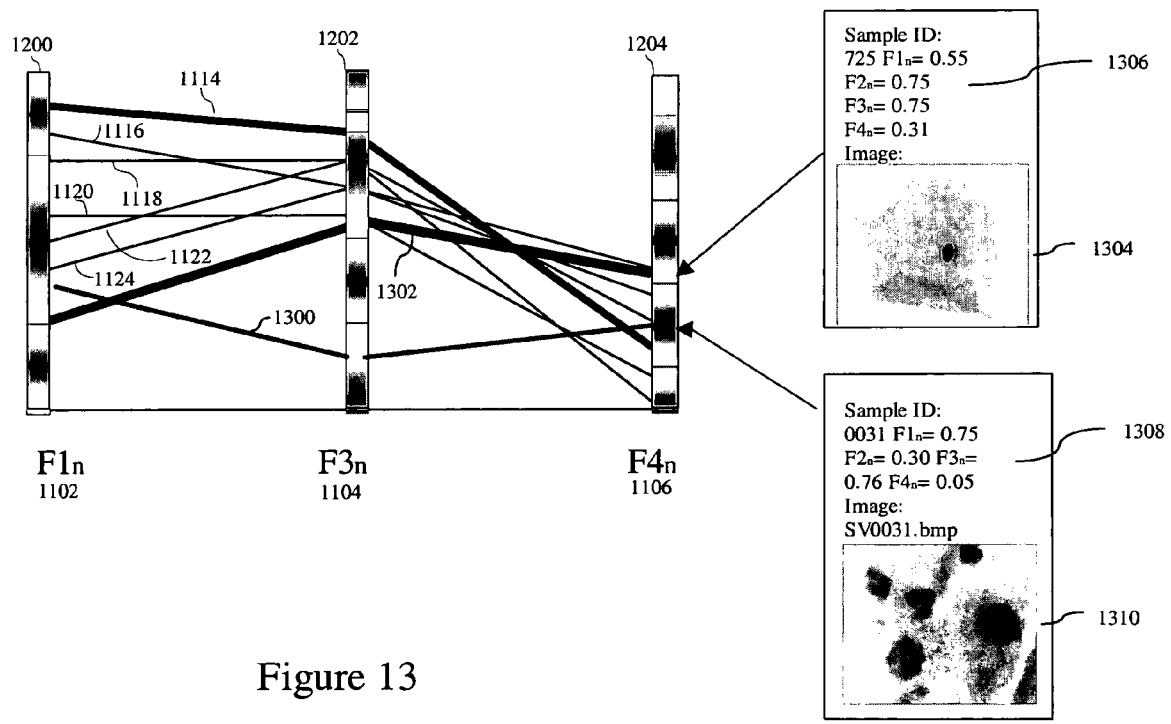
FIG. 13 shows an illustrative example of the contrast presentation under the parallel coordinate method.

The contrast presentation could be performed using the same framework under the parallel coordinate technique. The representative samples from the correct label and wrong label could be highlighted by a different color and a user could select them to view the detail information of the sample. This is illustrated in FIG. 13. As shown in FIG. 13, the representative correct labeled sample 1302 and the representative wrong label sample 1300 are shown and their feature values, 1306, 1308, and images 1304, 1310 could also be displayed.

Those skilled in the art should recognize that other methods of contrast presentation could be used. Furthermore, other methods of showing individual samples could also be used and they are all within the scope of the invention.

V.4 Multi-level Abstraction

Since the polygonal lines in the parallel coordinate visualization technique may overlap, the number of the data items that can be visualized on the computer screen at the same time is limited to about 1,000 data items. This is ideal for the rule viewing of a regulation tree or any decision trees that are based on the divide and conquer principle. When showing a rule in a great detail, the deep nodes are shown that only correspond to a subset of the data. This naturally supports the multi-level abstraction visualization.

In one embodiment of the invention, a regulation tree with sufficient depth is created as the baseline knowledge model. In the overview mode, a shallower tree is used that could be created by pruning the deep tree or simply limiting the depth of the tree and combining all nodes beyond the depth limit. In the zoom and filter mode, certain branches of the trees could be allowed to expand following user direction. In the details-on-demand mode, the deepest branch of the tree that corresponds to human interest is shown. The above disclosed visualization method is equally applicable at all three levels of the abstraction.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different equipment and devices and dimensionality and relations, and that various modifications, both as to the implementation details and detailed procedures, can be accomplished without departing from the scope of the invention itself.

What is claimed is:

1. An interactive data mining method comprises the steps of:

a) Inputting a presentable knowledge model into a computer for data mining, the presentable knowledge model being a modified regulation tree deriving and adding additional statistics at each node, the additional statistics including contrast examples for each terminal node and associated feature distribution profiles for each non-terminal node of the modified regulation tree;

b) Performing rule viewing of a terminal node in the presentable knowledge model by a parallel coordinate visualization technique that maps a multiple dimensional space onto two display dimensions and at least one data item is presented as a polygonal line wherein path from root node through non-terminal nodes toward a terminal node is presented and weight of a sample is highlighted by the thickness of the line;

c) the rule viewing step further highlighting samples having representative feature values from correct label and wrong label, samples from correct label and wrong label being sorted according to their closeness or similarity to the representative feature values and the contrast examples are selected as high rank samples from both correct label and wrong label population; and d) performing data mining using multi-level abstraction including an overview mode, a zoom and filter mode and a details-on-demand mode and the multi-level abstraction further comprising the steps of:

a) creating a regulation tree as a baseline knowledge model;
b) in the over view mode, using a shallower tree that could be created by pruning the tree or simply limiting the depth of the tree and combining all nodes beyond a depth limit;
c) in the zoom and filter mode, allowing certain branches of the tree to expand following user direction; and
d) in the details-on-demand mode, showing the deepest branch of the tree that corresponds to human interest.

* * * * *